A. T. DAWSON AND G. T. BUCKHAM.
ELECTRICAL SIGNALING SYSTEM.
APPLICATION FILED MAY 29, 1918.
1,347,258.
Patented July 20, 1920.
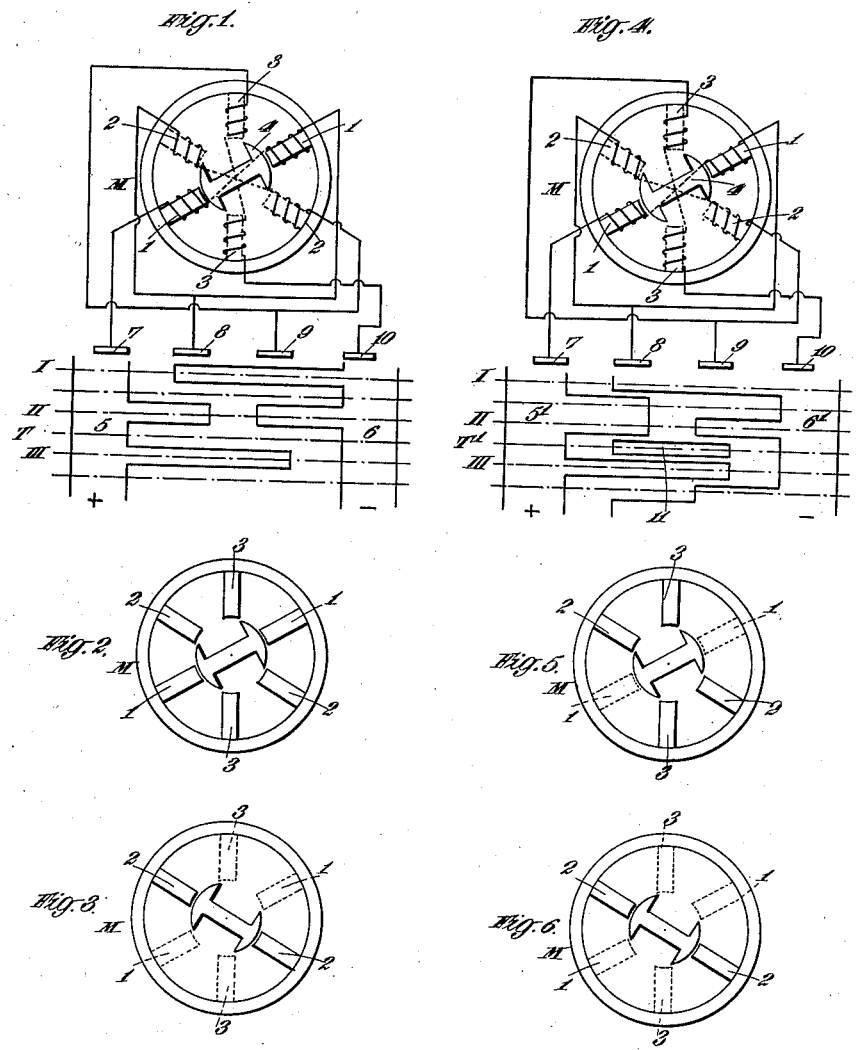

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, LONDON, ENGLAND.

ELECTRICAL SIGNALING SYSTEM.

1,347,258. Specification of Letters Patent. Patented July 20, 1920.

Application filed May 29, 1918. Serial No. 237,361.

*To all whom it may concern:*

Be it known that we, Sir ARTHUR TREVOR DAWSON, Knight, and Sir GEORGE THOMAS BUCKHAM, Knight, both subjects of the King of Great Britain, residing at Vickers House, Broadway, Westminster, in the county of London, England, have invented certain new and useful Improvements in or Relating to Electrical Signaling Systems, of which the following is a specification.

This invention relates to electrical signaling systems and more particularly to such systems in which the signal devices comprise motors which have a step-by-step movement for indicating orders, ranges, etc., such as employed for gun fire control and other purposes. In such systems the motors comprise a field magnet having several poles and an armature having two or more poles, the energization of the field magnet poles in a definite sequence serving to give a step-by-step movement to the armature and thereby give or determine the required signals.

According to the present invention, between the period of energization of the field poles to give one signal and the period of energization of the field poles to move the armature forward and give say the next signal, all, or a number of the field poles are energized to magnetically retain the armature against movement. In systems hitherto proposed it has been usual to energize the poles for the second signal referred to, before breaking the connections for the first signal, as otherwise the armature would be left free momentarily and its momentum might cause it to move on to an indefinite and therefore incorrect position. The energization of the field poles for the second signal before breaking the connections for the first signal however entails the armature making a weak half-step movement and a bigger current is taken than that required to obtain the strong steps. With the arrangement according to this invention, the half-step movement is obviated without cutting off current to the motor.

In order that the invention may be clearly understood and readily carried into effect the same will now be more fully described with reference to the accompanying drawings which illustrate by way of example embodiments of the invention and in which:—

Figure 1 is a diagram of the step-by-step motor and a transmission switch for operating the same according to one embodiment of the invention.

Figs. 2 and 3 illustrate the step-by-step motor with the circuit conditions different from that in Fig. 1.

Figs. 4, 5 and 6 are diagrams corresponding to Figs. 1, 2 and 3 but showing another embodiment of the invention.

Referring to Figs. 1, 2 and 3, the step-by-step motor M comprises three pairs of opposite field poles 1, 1; 2, 2; and 3, 3; the energizing windings of the two poles of each pair being connected in series. The motor also comprises a two-pole unwound armature 4. The transmission switch T comprises a contact drum (shown developed) having two contact segments 5 and 6 which are permanently connected to the two terminals of the generator and four contact fingers 7, 8, 9 and 10. The contact fingers are connected to the energizing windings of the field poles in the manner shown. The transmission switch has operative signaling position I, II and III and three intermediate operative positions as hereinafter described.

In the various figures the poles of the motor which are energized are shown in full lines and those which are deënergized in dotted lines.

Assuming the transmission switch to be in position I the windings of the poles 1, 1 will be energized and the armature in the position shown in Fig 1. The circuit is as follows: from contact segment 5, contact finger 7, windings of poles 1, 1 contact finger 8 to contact segment 6. During this time the windings of poles 2, 2 and 3, 3 are short circuited through contact fingers 8, 9 and 10 and contact 6. If now the transmission switch is moved one step to position II the switch passes through an intermediate position in which the windings of the field poles are all energized in series, the circuit being from contact 5, contact finger 7, through the windings of field poles 1, 1; 2, 2 and 3, 3 in succession, contact finger 10 to contact 6. Consequently during this transition period the armature is magnetically held against movement, this position of the armature being illustrated in Fig. 2. When the switch reaches the position II, the windings of poles 2, 2 are energized, the windings of poles 1, 1 and 3, 3 being short circuited.

The circuit is from contact 5; contact finger 8, windings of poles 2, 2 in series, contact finger 9 to contact 6. Consequently the armature moves in a clockwise direction into line with the poles 2, 2 as shown in Fig. 3. If the switch is moved to position III, in being moved to this position it passes through an intermediate position in which all of the poles are again energized, thereby magnetically retaining the armature against movement. When the switch reaches position III the windings of poles 3, 3 are energized and the armature moves forward a step so as to be in line with poles 3, 3. In passing from position III to position I the switch again passes through an intermediate position in which all of the field poles are energized.

It will be seen that by moving the switch through a complete revolution the armature can be set in six different signaling positions. With an eight pole armature twenty-four steps per revolution are obtained and so on.

Instead of the arrangement above described the windings can be open circuited as necessary to leave the required poles energized for producing the step-by-step movements.

Instead of energizing all of the field poles to retain the armature, a number of the poles less than the total number of poles may be energized, one such an arrangement being illustrated in Figs. 4, 5 and 6. The motor M is exactly similar to the motor M in Fig. 1, but the transmission switch T' is so arranged that between the operative signaling positions two pairs of poles only are energized to retain the armature against movement. If for example the transmission switch is in position I the poles 1, 1 will be energized and the armature in the position shown in Fig. 4, the circuit being from contact 5', contact finger 7, windings of poles 1, 1 contact finger 8, to contact segment 6'. During this time the windings of poles 2, 2 and 3, 3 are short circuited by contact 6'. If the switch is moved to position II it passes through an intermediate position in which the windings of field poles 2, 2 and 3, 3 are energized in series, the winding of poles 1, 1 being short circuited by contact 5'. While the switch is passing through this intermediate position the armature is maintained in line with poles 1, 1 as indicated in Fig. 5, by the energization of the poles 2, 2 and 3, 3. When the switch reaches position II only poles 2, 2 are energized as indicated in Fig. 6. A contact 11 is provided on the transmission switch which serves to short circuit the windings of poles 2, 2 while the switch is passing from position II to position III.

With a constant voltage system if the windings are connected in series as hereinbefore referred to, the current taken during the transition period is less than that required for the actual step-by-step movements. The windings may be connected however in parallel or series-parallel combinations. A series-parallel combination is preferably employed if the field poles do not happen to be exactly spaced on the field ring, as by energizing the poles unequally the armature may be maintained rigidly in position, whereas if a series connection is employed a movement might be given to the armature due to the above mentioned fault in construction of the field magnet.

By arranging that there is only one active pole or pair of poles per step and retaining control of the armature throughout the transmission as described, the advantage of evenness of step and maximum strength for each step is obtained, this maximum strength being obtained with less maximum current and less average current than in motors wound to give the same torque according to previous methods.

What we claim and desire to secure by Letters Patent of the United States is:—

1. The method of operating an electric motor comprising a number of field poles with windings therefor and a coöperating armature which consists in selectively energizing said windings to move said armature from one position to another and in energizing a number of said windings to retain magnetically said armature against movement between the period of energizing two successive selections of said windings.

2. The method of operating an electric motor comprising a number of field poles with windings therefor and a coöperating armature which consists in selectively energizing said windings to move said armature from one position to another and in energizing all of said windings to retain magnetically said armature against movement between the period of energizing two successive selections of said windings.

3. A method of operating a step-by-step electric motor comprising a number of field poles with windings therefor and a coöperating armature which consists in energizing said windings in a definite sequence to give a step-by-step movement to said armature and in energizing all of said windings to retain magnetically said armature against movement between the period of energization of certain of said windings and the period of energization of other of said windings next in the sequence.

In testimony whereof we affix our signatures.

ARTHUR TREVOR DAWSON.
GEORGE THOMAS BUCKHAM.